United States Patent
Bauer et al.

(10) Patent No.: US 12,232,650 B2
(45) Date of Patent: Feb. 25, 2025

(54) FRY BASKET

(71) Applicant: Marmon Foodservice Technologies, Inc., Osseo, MN (US)

(72) Inventors: Rich Bauer, Palatine, IL (US); Mark Gartz, Osseo, MN (US)

(73) Assignee: Marmon Foodservice Technologies, Inc., Osseo, MN (US)

(*) Notice: Subject to any disclaimer, the term of this patent is extended or adjusted under 35 U.S.C. 154(b) by 734 days.

(21) Appl. No.: 17/509,634

(22) Filed: Oct. 25, 2021

(65) Prior Publication Data

US 2022/0125245 A1    Apr. 28, 2022

Related U.S. Application Data

(60) Provisional application No. 63/104,619, filed on Oct. 23, 2020.

(51) Int. Cl.
*A47J 37/12* (2006.01)

(52) U.S. Cl.
CPC .................................. *A47J 37/1295* (2013.01)

(58) Field of Classification Search
CPC .................................................. A47J 37/1295
USPC .......................................... 99/413, 416, 450
See application file for complete search history.

(56) References Cited

U.S. PATENT DOCUMENTS

| | | | |
|---|---|---|---|
| 3,613,553 A * | 10/1971 | Popeil ................. | A47J 37/1295 99/426 |
| 4,006,675 A | 2/1977 | Lill | |
| 4,232,596 A | 11/1980 | Kroll et al. | |
| 4,559,869 A * | 12/1985 | Hogan ................. | A47J 37/0694 99/449 |
| 5,079,020 A | 1/1992 | Koopman et al. | |
| 5,437,380 A * | 8/1995 | Peay ..................... | A47F 5/0056 211/184 |
| 6,415,934 B1 | 7/2002 | Veltrop et al. | |
| D507,108 S | 7/2005 | Suero, Jr. | |
| 7,341,162 B2 | 3/2008 | Svabek et al. | |
| 7,546,987 B2 | 6/2009 | Sinkoff | |
| D629,662 S | 12/2010 | Thompson | |
| 9,186,021 B1 | 11/2015 | Dover | |
| 9,220,371 B1 | 12/2015 | Demirakos et al. | |
| 9,504,356 B2 | 11/2016 | Matos | |
| 9,706,876 B2 | 7/2017 | Walker | |

(Continued)

OTHER PUBLICATIONS

Franklin Machine Products Fryer Basket, Model No. 225-5002, retrieved from https://cdn.shopify.com/s/files/1/0840/1021/products/510332_2.jpg?v=1612388834 on Jul. 30, 2021.

(Continued)

*Primary Examiner* — Reginald Alexander
(74) *Attorney, Agent, or Firm* — Andrus Intellectual Property Law, LLP

(57) ABSTRACT

A basket for deep frying food items includes a bottom. Opposed side walls and opposed end walls extend from the bottom. om the bottom and extend between the opposed side walls, the opposed side walls and the opposed end walls forming a top opening into an open interior defined by the opposed side walls, the opposed end walls, and the bottom. A plurality of dividers extend upwards from the bottom between the opposed end walls. The plurality of dividers define a plurality of lanes. Each lane includes an equal cross-sectional area in a lateral dimension.

17 Claims, 6 Drawing Sheets

(56) References Cited

U.S. PATENT DOCUMENTS

| | | |
|---|---|---|
| D833,691 S | 11/2018 | Chavez et al. |
| 2002/0017198 A1 | 2/2002 | Gauthier et al. |
| 2008/0286431 A1 | 11/2008 | Brown |
| 2010/0263552 A1* | 10/2010 | Hendrickson ........... A47J 27/10 99/416 |
| 2013/0118473 A1 | 5/2013 | Linton |
| 2015/0297031 A1 | 10/2015 | Hammac et al. |
| 2018/0110365 A1 | 4/2018 | Witberg |
| 2020/0078971 A1 | 3/2020 | Sweeney et al. |

OTHER PUBLICATIONS

Franklin Machine Products Fryer Basket Insert, Model No. 226-1007, Franklin Machine Products, retrieved from https://www.fmponline.com/fryer-basket-insert-fmp-226-1007/ on Jul. 30, 2021.
Prince Castle-McDonalds Fry Basket Specifications, Prince Castle LLC, published 2018.

* cited by examiner

FRY BASKET

CROSS-REFERENCE TO RELATED APPLICATIONS

The present application claims priority of U.S. Provisional Patent Application No. 63/104,619, filed on Oct. 23, 2021, the contents of which is hereby incorporated by reference in its entirety.

BACKGROUND

The present disclosure relates to the field of food preparation. More specifically, the present disclosure relates to a basket for deep frying food.

Quick service and fast food restaurants frequently use deep frying as a method for thermal treatment of food items. These food items may be cooked, partially cooked, and/or frozen before deep frying. The food items cooked by deep frying include French fries, chicken tenders chicken nuggets, chicken patties, or fish filets. The food items are typically placed into wire-formed baskets which, in turn, are submerged or partially submerged into a reservoir of cooking oil which is controlled to a set cooking temperature. Specialty baskets have been developed to promote optimal cooking of different sized and shaped food products during deep frying.

Chicken nuggets are a food item that consists of a formed meat patty that is breaded. Chicken nuggets are typically bite-sized (e.g. between 15-20 g) and cooked and served in batches. Instances of fusing present challenges in the deep frying of breaded food items. Fusing occurs when two breaded items are pressed together while deep frying and the breading of two or more food items cook together. After cooking the two food items are stuck together and must be separated before delivery to the customer. Separation of fused food items results in the tearing of the breading leaving too much breading on one food item and an unbreaded area on the other food item. Restaurant purveyors consider both of these conditions to be unacceptable for delivery to a customer and thus result in wasted product.

U.S. Pat. No. 5,079,020 discloses a fry basket with an insert that includes a plurality of vertical, parallel wire mesh dividers which extend longitudinally from one end of the insert to the other. The insert creates a plurality of compartments within the fry basket to receive food products for cooking.

U.S. Pat. No. 9,186,021 discloses a mold for frying tortillas. Each mold includes side walls that extend upwards from a base and vertical members that taper inward from an opening at the top of the walls towards the base. The vertical members are configured to hold the tortilla in front of the horizontal members of the side walls.

U.S. Pat. No. 9,220,371 discloses a fryer basket with a divider designed to reside within the fryer basket to form multiple compartments within the fryer basket. The divider includes a generally planar wire mesh and is sized to fit within the fryer basket.

U.S. Pat. No. 9,504,356 discloses a fryer basket with a frame and multiple shaped inserts that are retained by the frame. The inserts are sized to fit within the frame and include a pair of lateral sides having an extending structural member, such as a rim, for supporting the insert within the frame. The inserts are configured to retain one or more food items and include openings to allow a flow of cooking liquid therethrough.

U.S. Pat. No. 9,706,876 discloses a food support assembly defining a basket for receiving and retaining a food product. The assembly includes a support frame with a u-shaped bar with two side bars, a base bar, and two articulating side walls.

Each of the above-noted patents are hereby incorporated by reference in their entireties.

Specialty baskets have been developed to promote the cooking of small food items like chicken nuggets. These specialty baskets include dividers designed to reduce food item contact while deep frying. However, it has been recognized that These specialty baskets present further challenges as the food items, and particularly chicken nuggets, become wedged and or trapped within the space is defined by the dividers. Wedged chicken nuggets not only are susceptible to fusing but even if fusing does not occur wedged food products are difficult to remove from the basket after cooking often requiring additional physical forces placed on the basket to knock or jar the food items loose. This causes damage to the baskets as well as damage to the kitchen structures to which the baskets are hit.

BRIEF DISCLOSURE

The present disclosure relates to the field of food preparation. More specifically, the present disclosure relates to a basket for deep frying food.

An example of a basket for deep frying food items includes a bottom. Opposed side walls extend from the bottom and angle outwards from the bottom. Opposed end walls extend from the bottom and extend between the opposed side walls, the opposed side walls, and the opposed end walls forming a top opening into an open interior defined by the opposed side walls, the opposed end walls, and the bottom. A plurality of dividers extend upwards from the bottom between the opposed end walls. The plurality of dividers define a plurality of lanes. Each lane includes an equal cross-sectional area in a lateral dimension.

In examples of the basket, each divider of the plurality of dividers includes a frame that includes end bars and includes at least a top crossbar and a bottom crossbar extending between the end bars. Each divider of the plurality of dividers further includes a plurality of divider rails secured to the outsides of the frame between the top crossbar and the bottom crossbar. The plurality of divider rails include divider rail pairs secured to matching positions on opposite sides of the frame. A plurality of intermediate wires extend between the end bars of the frame and parallel to the top crossbar and the bottom crossbar. The intermediate wires are internal to the divider rails and secured to the end bars at abutment joints.

In further examples of the basket, a plurality of intermediate wires may each include a body portion and an overlapping portion at each end of the intermediate wire. The body portion of each intermediate wire is positioned between the end bars and internal to the divider rails. The overlapping portions extend across the end wires in a depth dimension and are secured to the end wires. The overlapping portions of an intermediate wire of the plurality of intermediate wires may extend across the end wires at a same lateral side of the frame. Overlapping portion of an intermediate wire of the plurality of intermediate wires may extend across the end wires at opposite lateral sides of the frame. The overlapping portions of an intermediate wire of the plurality of intermediate wires may be co-planar with at least some of the divider rails secured to the frame.

In other examples of the basket. The opposed end walls angle outwards away from the bottom. The dividers are positioned within the open interior of the basket with a top crossbar of each of the dividers at a position that evenly divides a top lateral distance between the opposed sidewalls between each of the dividers into the plurality of lanes. The dividers may be positioned within the open interior of the basket with the bottom crossbar of each of the dividers at a position that evenly divides a bottom lateral distance between the opposed sidewalls between each of the dividers into the plurality of lanes. The plurality of dividers may include at least three dividers. The plurality of dividers may include at least three dividers with a central divider that extends vertically and perpendicular to the bottom of the basket and lateral dividers to either lateral side of the central divider that extend away from the bottom of the basket and are angled laterally away from the central divider. A first acute angle between the respective lateral dividers and the bottom of the basket is greater than a second acute angle between the respective opposed sidewalls and the bottom of the basket.

In still further examples of the basket, the respective end bars of each of the plurality of dividers are connected to end racks to form a divider assembly. The dividers in the divider assembly extend between the end racks. The bottom crossbar of each of the dividers of the plurality of dividers further includes divider projections that extend coaxially away from the bottom crossbar in a depth dimension. The end racks each include a plurality of rungs extending between end rack uprights. A rung of the plurality of rungs is secured across the divider projections and the end bars of the plurality of rungs are secured to the plurality of rungs of a respective end rack. The plurality of dividers may include three dividers with a central divider that is secured to the plurality of rungs to extend vertically and perpendicular to the bottom of the basket and lateral dividers to either side of the central divider that are secured to the plurality of rungs to extend from the bottom of the basket angled laterally away from the central divider at a first acute angle between the lateral dividers and the bottom of the basket. The first acute angle is greater than a second acute angle between the respective sidewalls and the bottom of the basket. The divider assembly may be configured to be removable from the open interior of the basket.

DETAILED DISCLOSURE

Figure 1:
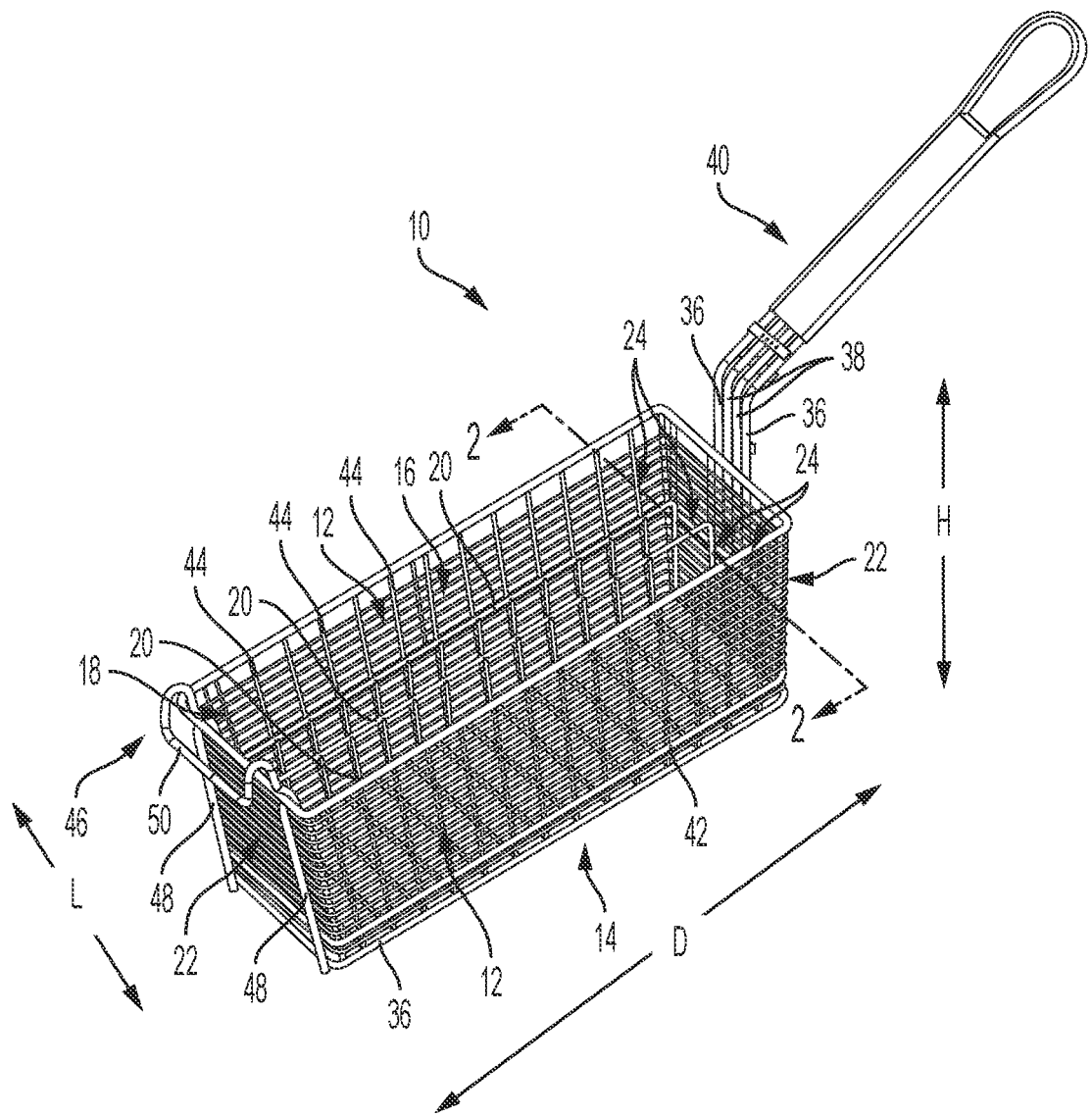
FIG. 1 is a perspective view of an example of a basket.
Figure 2:
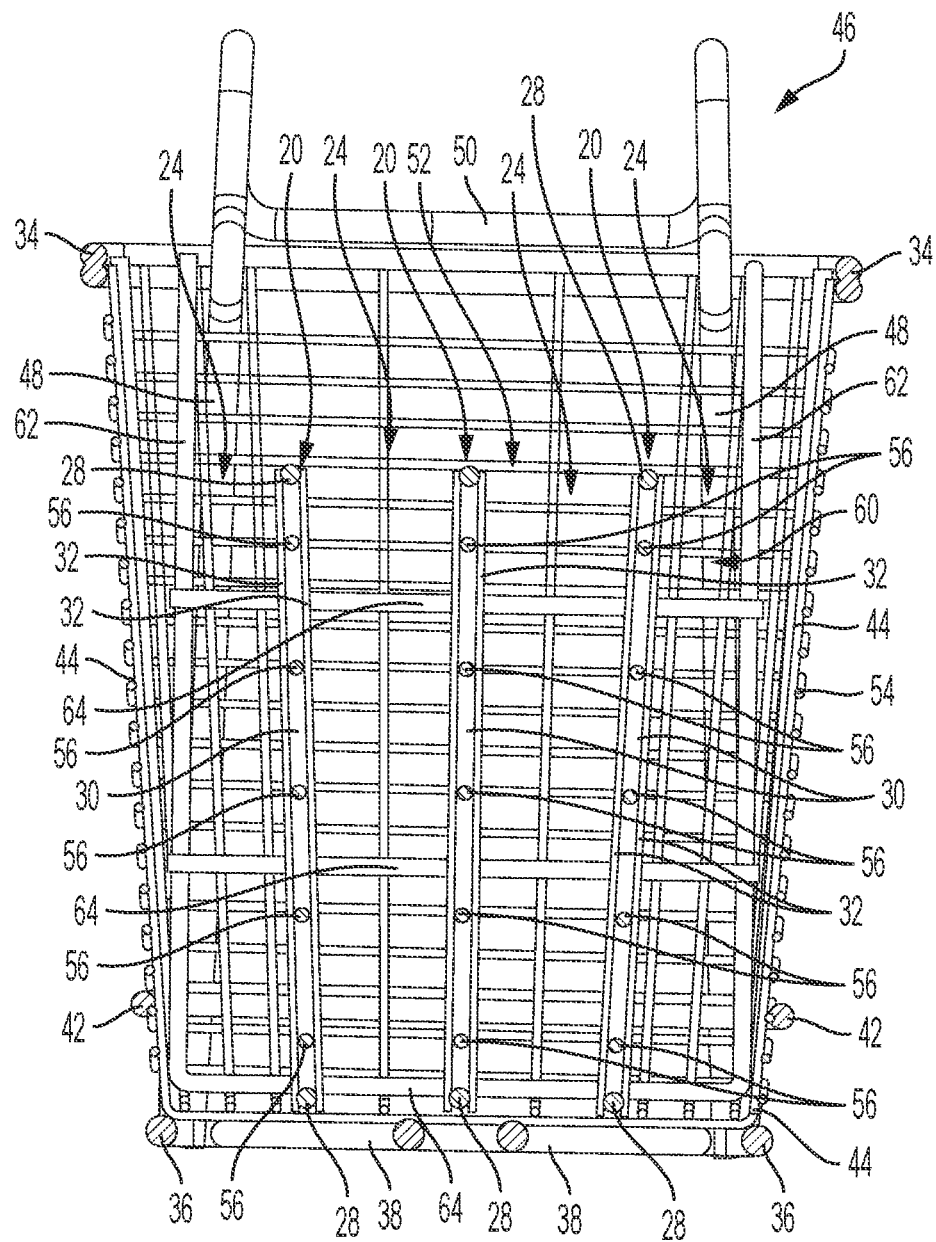
FIG. 2 is an end cross-sectional view of the basket taken along line 2-2 of FIG. 1.

FIG. 1 is a perspective view of a basket 10 of the present disclosure. FIG. 2 is an end cross-sectional view of the basket 10 taken along line 2-2 of FIG. 1. The basket 10 includes side walls 12 and a bottom 14. The side walls and bottom define an open interior 16 in which the food items are placed. The top 18 of the basket is open into the open interior 16. The basket is exemplarily constructed of wire forming. U.S. Pat. No. 6,415,934 and U.S. Patent Application Publication No. 2015/0297031 disclose various forms and aspects of fry baskets and are both incorporated by reference herein in their entireties. Dividers 20 are positioned within the open interior 16. The dividers 20 exemplarily extend from the bottom 14 in the direction of the open top 18. The dividers 20 further extend between the end walls 22A, 22B of the basket 10. The dividers 20 separate the open interior 16 of the basket 10 into separate lanes 24. As can be best seen in FIG. 2, the dividers 20 are shorter in height than the side walls 12 or the end walls 22A, 22B and thus terminate within the open interior 16 at a position below the open top 18 of the basket 10.

The top 18 of the basket 10 is exemplarily defined by a top wire 34, which defines a top perimeter of the open interior 16. The top wire 34 may exemplarily be a double wire as shown, for example for durability of construction, although such feature is not required within the scope of the present disclosure. The bottom 14 of the basket 10 is defined by a bottom wire 36, which defines a bottom perimeter of the basket 10. Depicted in the cross-section of FIG. 2, the basket 10 may further include a base wire 38 that underlies the open interior 16 of the basket 10. In examples, the bottom wire 36 and the base wire 38 further extend to and up the back end wall 22B and further extend away from the back end wall 22B to form a handle 40 of the basket 10. Optionally, the basket 10 may further include a lower wire 42 that is proximate to but vertically spaced from the bottom wire 36 to provide additional strength and durability to the basket construction.

A plurality of generally U-shaped basket rails 44 extend between opposed sides of the top wire 34, contacting the bottom wire 36, base wire 38, and optionally the lower wire 42. Each basket rail 44 is exemplarily welded to the respective top wire 34, bottom wire 36, base wire 38, and lower wire 42 at each of these contact locations. As depicted, the basket rails extend as described above define the side walls 12 and the end walls 22A, 22B. In an example, a continuous horizontal wire 54 is wound around the plurality of basket rails 44 to define the wire mesh of the side walls 12 and the end walls 22A, 22B.

A hook 46 is secured to the front end wall 22A. The hook 46 includes hook rails 48 that extend in a generally vertical direction along the front end wall 22A, exemplarily in front of the bottom wire 36 and the lower wire 42 and behind the top wire 34. The hook 46 terminates in a hook projection 50 that extends over the top wire 34 and forward beyond the front wall 22A extending away in a direction away from the handle 40 and downward towards the direction of the bottom 14.

Figure 5:
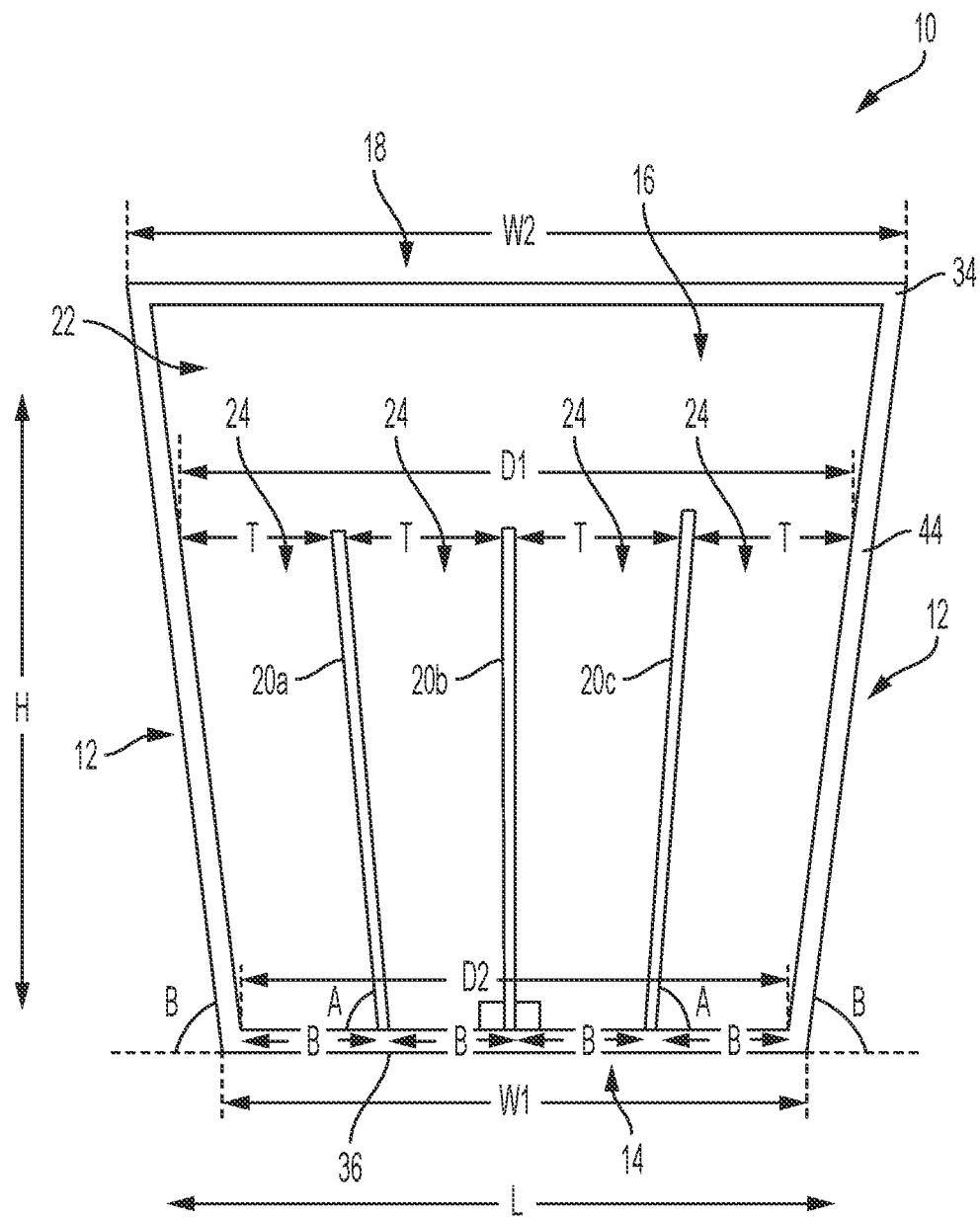
FIG. 5 is a schematic cross-section of an example of a basket.

FIG. 5 is a schematic cross-section of an example of a basket 10. With primary reference to FIGS. 2 and 5, the basket 10 includes a plurality of dividers 20. In some examples as disclosed herein, the plurality of dividers 20, exemplarily, but not limited to, three dividers 20, are secured together to form a divider assembly 52. The basket 10 is smaller in width (W1) between the side walls 12 at the bottom 14 than the width (W2) of the basket at the open top 18. Thus the side walls 12 are angled outwards from the bottom 14 to the open top 18. Similarly, the end walls 22 may also angle outwardly as well, for example as seen in FIG. 1. In the presently disclosed basket, the dividers 20 are oriented at angles as well. The basket 10 of FIG. 1 includes three dividers, although it will be recognized that examples may have two or more dividers. The dividers are arranged so that the lateral distance (D1) between the side walls 12 is equally divided by the tops of the dividers 20. The lateral distance (D2) between the side walls 12 at the bottom 14 of the basket 10 is also equally divided by the bottoms of the dividers 20. In this manner, the space of the open interior 16 of the basket 10 is equally divided by the dividers across any lateral cross-section of the basket. In the example of FIGS. 2 and 5, the center divider 20b is vertical while the other two dividers 20a, 20c are angled. Because there is an odd number of dividers, the center divider 20b is positioned at the center of the open interior 16 between the side walls 12. Thus when there are odd numbers of dividers there is a vertical center divider 20b, but such vertical center divider may not be present in all examples, particularly if the basket is divided into an odd number of lanes 24.

The dividers 20 thus define a plurality of lanes 24 within the open interior 16 of the basket 10. Each of the lanes 24 are equal in cross-sectional area taken along any plane extending in the lateral dimension L and depth dimension D, at any height in dimension H. Dimension T is the same across the lanes 24 at the top of the dividers 20, and dimension B is the same across the lanes 24 at the bottom of the dividers 20. In one non-limiting example, dimension W1=110 mm, W2=143 mm, T=29.5 mm, and B=23.5 mm. In another non-limiting example, dimension W1=99 mm, W2=125 mm, T=23 mm, and B=19 mm. It will be recognized that these are merely exemplary dimensions and that other dimensions will be recognized based upon the present disclosure. The exact dimensions of any particular implementation of the disclosed basket will depend in part upon the specific food item to be cooked and the size/shape of the fryer. In the case of chicken nuggets, the number of dividers 20 within the basket is selected such that the individual spacing between the dividers at the top of the dividers 20 across lateral distance D1 is less than two times the nominal minor dimension of the chicken nugget. This dimension selection helps to ensure that two nuggets cannot simultaneously enter the same lane 24 in a manner in which the nuggets will become wedged within a lane 24. Conversely, the width of the lane at the bottom 14 of the basket is dimensioned to be greater than the nominal minor dimension of the chicken nugget. This helps to prevent individual chicken nuggets from becoming stuck in the bottom of the basket.

To maintain the consistency of the areas of the lanes, angles A between the outside dividers 20 and the plane of the bottom 14 are equal to each other and are steeper than angles B between the side walls 12 and the plane of the bottom 14. Similarly, the center divider 20b is perpendicular to the plane of the bottom 14, equidistant from the side walls 12 at any lateral cross section of the basket along dimension H.

Figure 6:
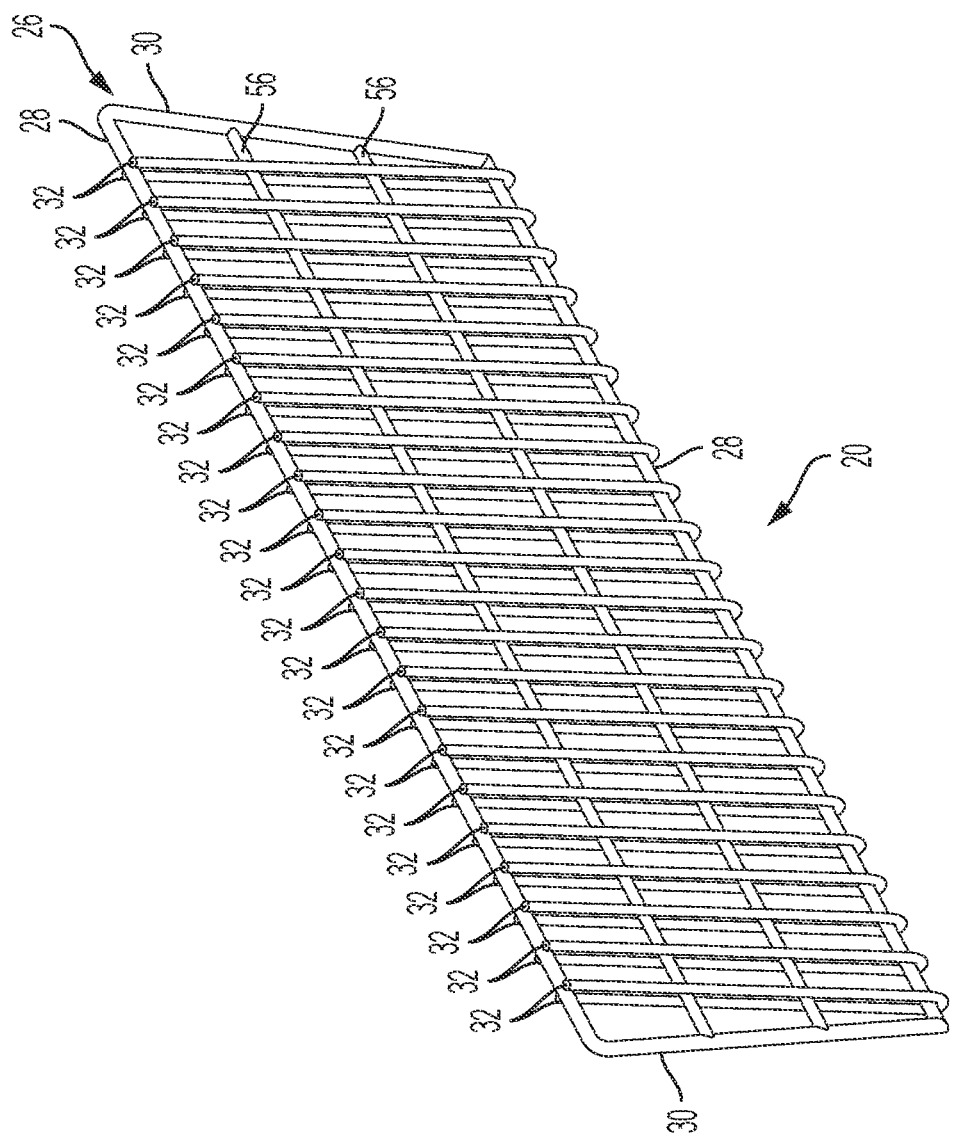
FIG. 6 is a detailed perspective view of an example of a divider.

FIG. 6 is a perspective view of an example of a divider 20. The divider 20 has a central frame 26, the central frame includes horizontal crossbars 28 connected by end bars 30. As previously noted, the end walls 22 of the basket 10 are exemplarily angled and the end bars 30 may be angled to match. Intermediate wires 56 extend generally parallel to the horizontal crossbars 28 between the end bars 30. In the example depicted in FIG. 6, the intermediate wires 56 are the same gauge of wire as the horizontal crossbars 28 and the end bars 30 and end in an abutment joint or a "T" intersection with the end bars 30, interior the central frame 26. A series of divider rails 32 extend generally vertically along the outside of the central frame 26 between the horizontal crossbars 28 and across the intermediate wires 56. The divider rails 32 exemplarily extend across the central frame 26 in aligned pairs, extending along either side of the central frame 26 and the aligned pairs are evenly spaced down the length of the divider 20. The divider rails 32 are exemplarily constructed of a smaller gauge of wire than the central frame 26 and the divider rails 32 are secured to the horizontal crossbars 28 and secured to the intermediate wires 56 at any intersection thereof by welding.

The divider rails 32 reduce the size of the openings within the divider 20 between the divider rails 32 and the intermediate wires 56 to areas in which it is unlikely for a food item intended to be cooked within the basket 10 (e.g. chicken nugget) to become wedged therein. Furthermore, the divider rails 32 so arranged have been found to promote emptying of the cooked food items from the basket 10, as the cooked food items engage and slide along the divider rails 32, directing the cooked food items out of the open top 18 of the basket 10 when the basket 10 is tilted over or otherwise generally inverted, act as rails upon which the chicken nuggets slide when the basket is emptied.

Figure 3:
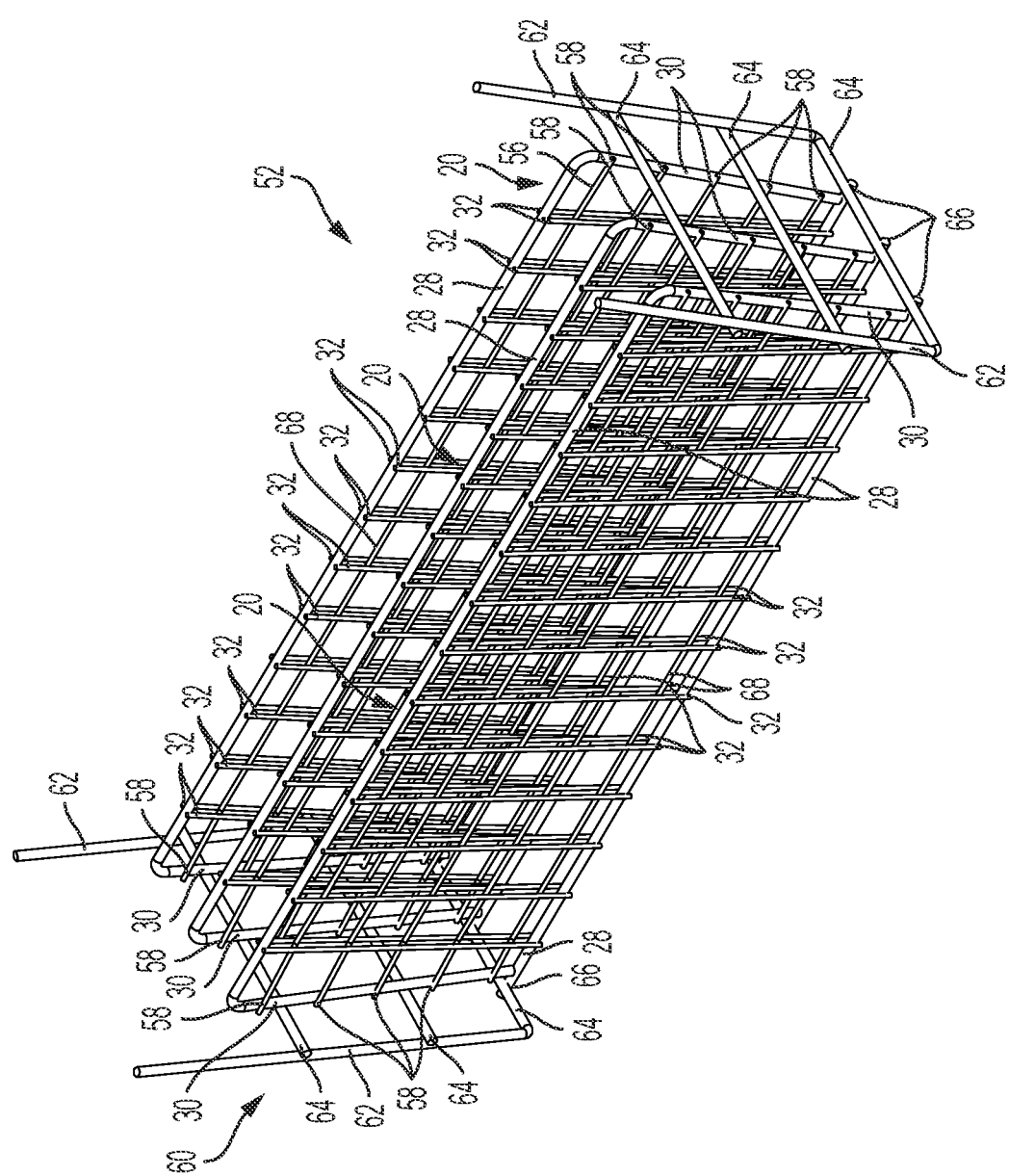
FIG. 3 is a detailed perspective view of an example of a divider assembly.
Figure 4:
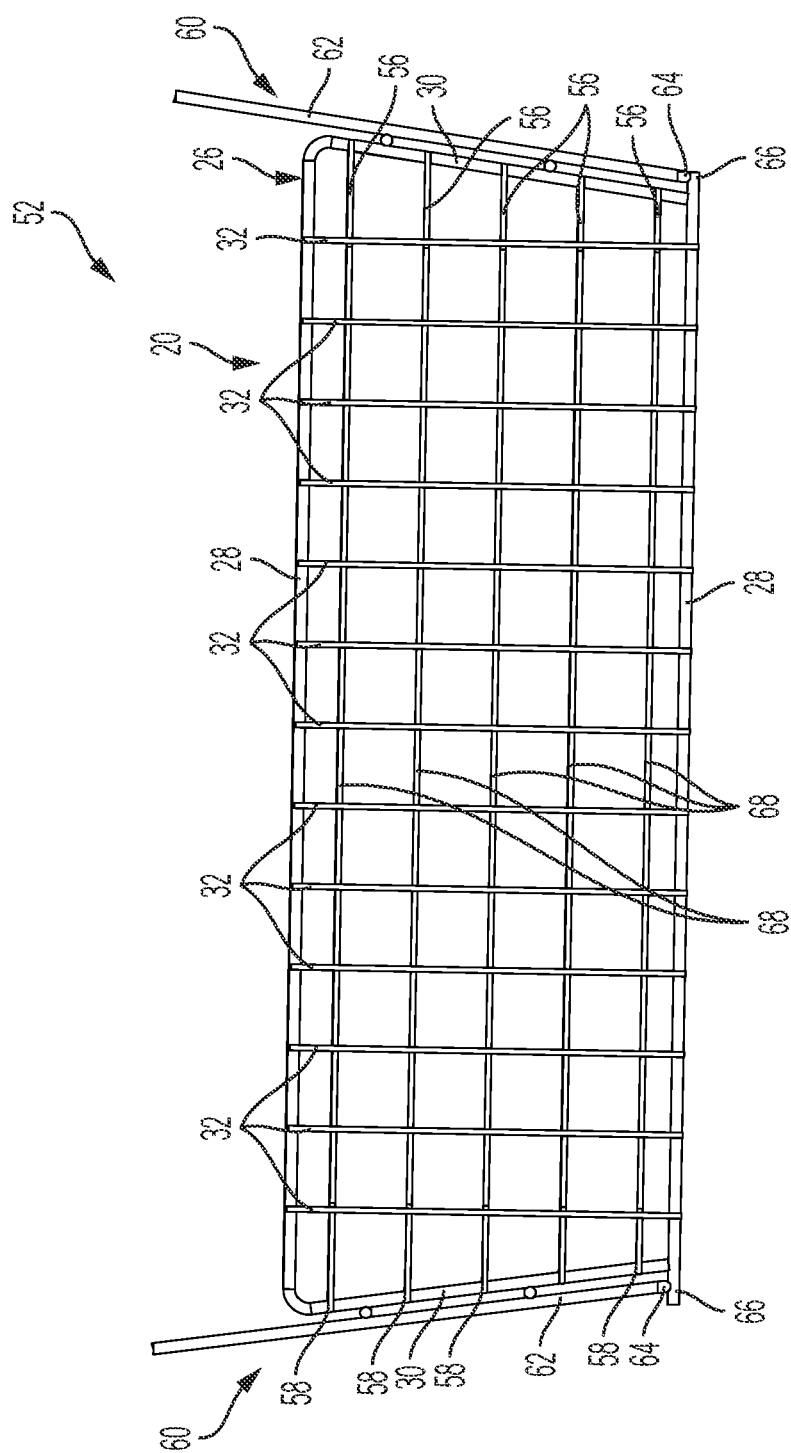
FIG. 4 is a side view of an example of the divider assembly.

FIG. 3 is a detailed perspective view of an example of a divider assembly 52. FIG. 4 is a side view of an example of the divider assembly 52. The divider assembly 52 includes three dividers 20. The dividers 20 may be constructed in the manner as described above with respect to FIG. 6. FIGS. 3 and 4 depict a further example of the construction of the dividers 20, it will be recognized that examples of the basket 10 as disclosed herein may use features of the disclosed dividers of an of FIG. 3, 4, or 6, or other combinations of features as shown in those figures to arrive at additional examples of dividers while remaining within the scope of the present disclosure.

The divider 20 of FIGS. 3 and 4 may include intermediate wires 56 that are secured a lateral side of the end bars 30 of the dividers 20 as opposed to an abutment or T joint within the interior of the frame 26. In an example, the intermediate wires 56 may be of a wire gauge similar to or the same as the divider rails 32, which may be a smaller gauge wire than those constructing the frames 26. The intermediate wire 56 may include a body portion 68 that is positioned within the frame 26 as described herein and the intermediate wire 56 further includes an overlapping portion 58 over the end bars 30. The body portion 68 of the intermediate wires are located within the frame 26 between the adjacent pairs of divider rails 32. The overlapping portions 58 of the intermediate wires 56 are welded to the end bars 30. This places the overlapping portions 58 of the intermediate wires 56 in a same plane as the divider rails 32 secured to a same side of the frame 26 as the overlapping portions 58. The intermediate wires 56 thus may exhibit an arc or an s-curve to position the body of the intermediate wires 56 within the frame 26, interior of the divider rails 32. In an example, the overlapping portions 58 of the intermediate wires 56 are secured to the same lateral side of the respective end bars 30 of the frame 26, bending the intermediate wires 56 into an arc. While in another example, the overlapping portions 58 of the intermediate wire 56 are secured to opposite lateral sides of the respective end bars 30, bending the intermediate wires 56 into an s-curve.

Two or more dividers 20 may be secured together into a divider assembly 52. The divider assembly 52 includes end racks 60 secured across the end bars 30 of the dividers 20. The end racks 60 function to connect the dividers 20 together at the respective angles as previously described in a system including multiple dividers 20. The connection of the dividers 20 in the divider assembly 52 maintains the angular relationship of the dividers such that the cross-sectional dimensions of the lanes 24 defined by the dividers 20 both across the bottom and the tops of the respective lanes remain consistent across the lanes 24. The end racks 60 are exemplarily constructed of a pair of uprights 62 and a plurality of rungs 64 extending between the uprights 62. In an example, a lowermost rung 64 may be a continuation of the wire of the uprights, the wire being bent in a generalized U-shape to form the uprights 62 and the lowermost rung 64 as a unitary structure, while in other examples, the lowermost rung 64 is secured to the uprights 62, for example by welding. The end bars 30 of each of the dividers 20 are secured to each of the rungs 64 of the end rack 60, thus fixing the angular relationship between the divider 20 and the interior of the basket.

The lowermost crossbars 28 of the dividers 20 include projections 66 that extend external of the frame 26. The lowermost rung 64 of the end racks 60 rests upon the projections 66 and may be secured thereto by welding. With the dividers each secured to the end racks 60, both along the end bars 30 and at the projections 66, the divider assembly 52 is a unitary structure. The divider assembly 52 may be used as an insert to optionally change the functionality of a fry basket to cook other food items, including chicken nuggets. In still further applications, the divider assembly 52 may be secured within the open interior 16 of the basket, for example by welding, to provide a unitary construction of the basket 10.

Combinations of features as disclosed herein in a new basket for use with deep fry cooking of food items have been found to reduce the loss of food product due to welding and to provide a basket that is more easily unloaded after being used to deep fry food.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A basket for deep frying food items, the basket comprising:
   a bottom;
   opposed side walls that extend from the bottom and angle outwards from the bottom;
   opposed end walls that extend from the bottom and extend between the opposed side walls, the opposed side walls and the opposed end walls forming a top opening into an open interior defined by the opposed side walls, the opposed end walls, and the bottom;
   a plurality of dividers extending upwards from the bottom between the opposed end walls, the plurality of dividers defining a plurality of lanes, each lane having an equal cross-sectional area in a lateral dimension;
   wherein each divider of the plurality of dividers comprises a frame comprising end bars and comprising at least a top crossbar and a bottom crossbar extending between the end bars and a plurality of divider rails secured to the outsides of the frame between the top crossbar and the bottom crossbar in divider rail pairs secured to matching positions on opposite sides of the frame.

2. The basket of claim 1, further comprising a plurality of intermediate wires extending between the end bars of the frame and parallel to the top crossbar and the bottom crossbar, the intermediate wires internal to the divider rails and secured to the end bars at abutment joints.

3. The basket of claim 1, further comprising a plurality of intermediate wires, wherein each intermediate wire comprises a body portion and an overlapping portion at each end of the intermediate wire, wherein the body portion of each intermediate wire between the end bars and internal to the divider rails and the overlapping portions extend across the end wires in a depth dimension and are secured to the end wires.

4. The basket of claim 3, wherein the overlapping portions of an intermediate wire of the plurality of intermediate wires extend across the end wires at a same lateral side of the frame.

5. The basket of claim 3, wherein the overlapping portions of an intermediate wire of the plurality of intermediate wires extend across the end wires at opposite lateral sides of the frame.

6. The basket of claim 3, wherein the overlapping portions of an intermediate wire of the plurality of intermediate wires are co-planar with at least some of the divider rails secured to the frame.

7. The basket of claim 1, wherein the opposed end walls angle outwards away from the bottom.

8. The basket of claim 1, wherein the dividers are positioned within the open interior of the basket with top crossbar of each of the dividers at a position that evenly divides a top lateral distance between the opposed sidewalls between each of the dividers into the plurality of lanes.

9. The basket of claim 8, wherein the dividers are positioned within the open interior of the basket with the bottom crossbar of each of the dividers at a position that evenly divides a bottom lateral distance between the opposed sidewalls between each of the dividers into the plurality of lanes.

10. The basket of claim 1, wherein the plurality of dividers comprises at least three dividers.

11. The basket of claim 10, wherein the plurality of dividers comprises at least three dividers, with a central divider that extends vertically and perpendicular to the bottom of the basket and lateral dividers to either lateral side of the central divider which extend away from the bottom of the basket and are angled laterally away from the central divider.

12. The basket of claim 11, wherein a first acute angle between the respective lateral dividers and the bottom of the basket is greater than a second acute angle between the respective opposed sidewalls and the bottom of the basket.

13. The basket of claim 10, wherein the respective end bars of each of the plurality of dividers are connected to end racks to form a divider assembly, wherein the dividers in the divider assembly extend between the end racks.

14. The basket of claim 13, wherein the bottom crossbar of each of the dividers of the plurality of dividers further comprises divider projections that extend coaxially away from the bottom crossbar in a depth dimension.

15. The basket of claim 14, wherein the end racks each comprises a plurality of rungs extending between end rack uprights, wherein a rung of the plurality of rungs is secured across the divider projections and the end bars of the plurality of rungs are secured to the plurality of rungs of a respective end rack.

16. The basket of claim 15, wherein the plurality of dividers comprises three dividers, with a central divider that is secured to the plurality of rungs to extend vertically and perpendicular to the bottom of the basket and lateral dividers to either side of the central divider that are secured to the plurality of rungs to extend from the bottom of the basket angled laterally away from the central divider at a first acute angle between the lateral dividers and the bottom of the basket, wherein the first acute angle is greater than a second acute angle between the respective sidewalls and the bottom of the basket.

17. The basket of claim 13 wherein the divider assembly is configured to be removable from the open interior of the basket.

* * * * *